Figure 1:
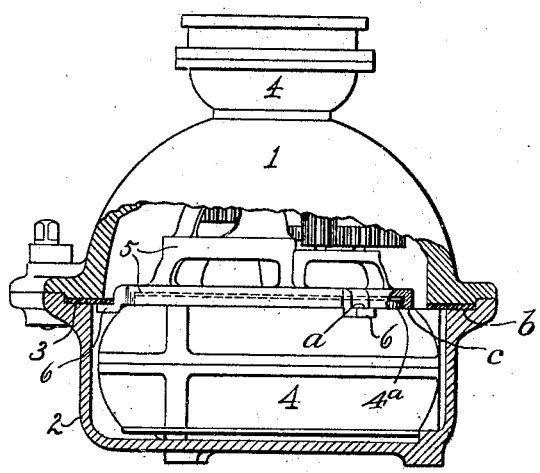

F. LAMBERT.
WATER METER.
APPLICATION FILED OCT. 1, 1919.

1,377,987.

Patented May 10, 1921.

INVENTOR.
Frank Lambert
BY
ATTORNEY.

UNITED STATES PATENT OFFICE.

FRANK LAMBERT, OF BROOKLYN, NEW YORK, ASSIGNOR TO THOMSON METER COMPANY, OF BROOKLYN, NEW YORK, A CORPORATION OF NEW JERSEY.

WATER-METER.

1,377,987. Specification of Letters Patent. Patented May 10, 1921.

Application filed October 1, 1919. Serial No. 327,654.

*To all whom it may concern:*

Be it known that I, FRANK LAMBERT, a citizen of the United States of America, and resident of the borough of Brooklyn, county of Kings, city and State of New York, have invented certain new and useful Improvements in Water-Meters, of which the following is a specification.

My invention relates to improvements in water meters, and particularly to meters intended to be free from injurious effects of frost. In such meters, there is commonly an outer casing (commonly formed in two parts which are bolted together or otherwise secured together) within which is a measuring chamber, and upon this measuring chamber there is commonly a gear frame, carrying gears to which motion is communicated by some member within the measuring chamber, which gears in turn drive suitable registering mechanism. The gear frame referred to is commonly screwed to the measuring chamber, as shown, for example, in my Patent No. 1,155,667, dated Oct. 5, 1915. This construction has the disadvantage that in the event of the freezing and expansion of the liquid contents of the meter, which commonly lifts the upper section of the meter casing, the gear frame cannot similarly lift from the measuring chamber; from which it frequently follows that the gear frame and gearing are warped or broken. In some cases, as in the construction shown in my Patent No. 765,144, dated July 12, 1904, the gear frame is held to the measuring chamber by means of springs; but the use of springs is not desirable, since in many cases they are quickly eaten away by the water or other liquid passing through the meter.

These objections I overcome, according to the present invention, by so constructing the gear frame that, while it is mounted on the measuring chamber, it is held in place normally by the upper member of the meter casing. In a frost-proof meter the freezing causes that member to rise, then the gear frame is also freed and permitted to separate from the measuring chamber.

My invention consists, therefore, in novel and improved means for holding the gear frame of a meter, and in other features as hereinafter described and particularly pointed out in the appended claims. The objects of my invention are, principally, to avoid warping or breakage of the gear frame and gearing in the event of freezing of the contents of the meter, and to simplify the construction, as there is no screw or spring required to hold the gear frame in position. This gear frame construction can be used with advantage in any kind of meter.

Figure 2:
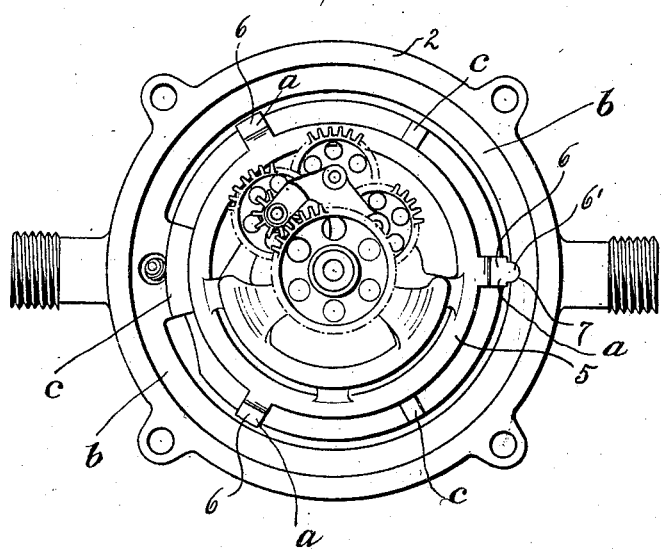

I will now proceed to describe my invention with reference to the accompanying drawings, in which one embodiment thereof is illustrated, and will then point out the novel features in claims. In said drawings:

Figure 1 is a side elevation and partial central vertical section of a meter embodying my invention; and Fig. 2 is a top view of the meter, with the upper section of the meter casing removed.

In said drawings: Numerals 1 and 2 indicate, respectively, the upper and the lower sections of the meter casing, and 3 designates a gasket between them. These upper and lower sections of the meter casing are commonly held together by suitable fastening means which will permit their separation in the event of freezing of the contents of the casing—such fastening means, for example, as that of my Patent No. 1,229,623, dated June 12, 1917, or that of my companion application, Serial Number 327,653, filed October 1, 1919. 4 designates the usual measuring chamber, located within the meter casing, and 5 designates a gear frame, of usual construction except as hereinafter pointed out, carrying gearing by which the usual registering device, not specifically shown, is driven. The gear frame has at the bottom a circular recess freely fitting a circular projecting flange 4ª of the measuring chamber so to centralize it therewith, but is not secured thereto. To hold it in place, the gear frame is provided with projecting overhanging lugs 6, three in number in the construction shown, which lugs are bent downward so that the top faces *a* of their overhanging end portions are flush, or practically so, with the gasket face *b*, of the lower member 2 of the meter casing, and with the top face or flange *c*, of the measuring chamber. Therefore, when the top member of the meter casing is bolted down, so holding down the gasket 3, it holds in place also the gear frame and the measuring chamber. In the event that freezing of the contents of the meter casing should lift the upper section of that casing, the gear frame will be freed thereby, and so can be lifted off from the measuring chamber by the ice, without injury.

It will be noticed that in this new construction the lugs 6 of the gear frame are not in supporting engagement with the lower casing part and are not fitting or in contact with any part of the meter at the perihpery or at their under-faces. These lugs, therefore, do not require to be of any special thickness or diameter. In fact, the underside and outside diameter of these lugs can be left from casting without any machining. This reduces the manufacutring cost of the meter.

It will also be observed that the gasket 3 overlaps the lugs 6 of the gear frame. This results in the advantage that the pressure on the lugs 6 (and, therefore, on the gear frame as a whole) is substantially constant, regardless of the thickness of the gasket. With a gasket which did not overlap the gear frame lugs, there would be the objection that variations in the thickness of the gasket (such as are bound to occur in practice) would result in the gear frame being too loose or in the lugs being bent down under pressure of the upper casing. This objection is wholly overcome by my new construction.

In a construction wherein the gear frame rests loosely, so to speak, on the measuring chamber, except as held in place by the upper member of the meter casing, it is obviously desirable to provide means for locating circumferentially that gear frame somewhat accurately with respect to other parts of the meter. For that purpose, I provide one of the overhanging lugs 6 with a projecting toe 6', freely entering a recess 7 of the lower member of the meter casing, as shown particularly in Fig. 2. This makes it impossible to bolt down the top member of the meter casing unless the gear frame be in proper position.

What I claim is:—

1. In a water meter, the combination of a two-part casing, a measuring chamber within said casing, a gear frame freely mounted on said measuring chamber, projecting lugs on said gear frame, said lugs being out of supporting engagement with the lower part of the meter casing, the top face of the lower casing part being substantially on a level with the top faces of said lugs, said top faces of the lower casing part and lugs coacting to form a level gasket support, a gasket on said support, and means on the upper casing part to bear down on said gasket and thereby hold said gear frame in place.

2. In a water meter, the combination of a two-part meter casing, a measuring chamber in said casing, a gear frame freely mounted on said measuring chamber and provided with lugs arranged to be engaged by one of the casing parts, said lugs being out of supporting contact with the other casing part, whereby the engagement between the casing and said lugs is independent of the thickness of said lugs.

3. In a water meter, the combination of a two-part meter casing, one of said parts being adapted to lift under excessive pressure within the casing, a measuring chamber within said casing, a gear frame freely mounted on said measuring chamber and provided with overhanging projecting lugs, a gasket on the other casing part and overlapping said lugs, and means on said movable casing part to engage said gasket and hold the gear frame in place, said gear frame being free to lift when said first-mentioned casing part is lifted, said lugs being so constructed and arranged that said holding of the gear frame on the measuring chamber is independent of the thickness of said lugs.

4. In a water meter, the combination of a two-part casing containing a measuring chamber, a gear frame centrally mounted on said chamber and having projecting lugs by means of which said gear frame is held in position by one of the casing parts, said lugs being so constructed and arranged that said holding of the gear frame on the measuring chamber is independent of the outside periphery or thickness of said lugs.

5. In a water meter, the combination of a two-part casing containing a measuring chamber, a gear frame mounted on said chamber and having projecting lugs out of contact with any part of the meter at their periphery and their under-side, and means engaging the top faces of said lugs to hold said gear frame in place.

6. In a water-meter, the combination of a two-part casing having a recess, a measuring chamber within said casing, a gear frame freely mounted on said measuring chamber, projecting lugs on said gear frame, said lugs being out of supporting engagement with the lower part of the meter casing, the top face of the lower casing part being substantially on a level with the top faces of said lugs, said top faces of the lower casing part and lugs coacting to form a level gasket support, a gasket on said support, and means on the upper casing part to bear down on said gasket and thereby hold the gear frame in place, one of said lugs having a portion arranged to enter said recess in the casing for circumferentially locating the gear frame.

7. In a water meter, the combination of a two-part casing, a measuring chamber within said casing, a gear frame freely mounted on said measuring chamber, projecting lugs on said gear frame, said lugs being out of supporting engagement with the lower part of the meter casing, the top faces of the lower casing part and of the measuring chamber being substantially on a level with the top faces of said lugs, all of said top faces coacting to form a level gasket support, a gasket on said support, and means on the upper casing part to bear down on said gasket and thereby hold said gear frame and said measuring chamber in place.

In testimony whereof I have signed this specification in the presence of two subscribing witnesses.

FRANK LAMBERT.

Witnesses:
 SETH D. HIGLEY,
 THOS. E. IRWIN.